US009790091B2

(12) United States Patent
Shon et al.

(10) Patent No.: US 9,790,091 B2
(45) Date of Patent: Oct. 17, 2017

(54) NEGATIVE ACTIVE MATERIAL INCLUDING MANGANESE OXIDES, NEGATIVE ELECTRODE INCLUDING THE SAME, LITHIUM BATTERY INCLUDING NEGATIVE ELECTRODE AND METHOD OF PREPARING NEGATIVE ACTIVE MATERIAL

(75) Inventors: Jeong-kuk Shon, Cheonan-si (KR); Jae-man Choi, Hwaseong-si (KR); Moon-seok Kwon, Hwaseong-si (KR); Min-sang Song, Seongnam-si (KR); Seung-sik Hwang, Seongnam-si (KR); Han-su Kim, Seoul (KR); Ji-man Kim, Suwon-si (KR); Gwi-ok Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 601 days.

(21) Appl. No.: 13/534,711

(22) Filed: Jun. 27, 2012

(65) Prior Publication Data
US 2013/0004850 A1 Jan. 3, 2013

(30) Foreign Application Priority Data
Jun. 30, 2011 (KR) .................. 10-2011-0065135

(51) Int. Cl.
*H01M 4/50* (2010.01)
*B82Y 30/00* (2011.01)
(Continued)

(52) U.S. Cl.
CPC .............. *B82Y 30/00* (2013.01); *C01G 45/02* (2013.01); *H01G 11/46* (2013.01); *H01G 11/50* (2013.01);
(Continued)

(58) Field of Classification Search
CPC ........ H01M 4/505; H01M 4/50; H01M 10/052; H01M 10/0525; C01P 45/02;
(Continued)

(56) References Cited

U.S. PATENT DOCUMENTS 3,635,694 A * 1/1972 Chu ............................... 75/766
5,502,014 A * 3/1996 Lee ............................ 501/135
(Continued)

FOREIGN PATENT DOCUMENTS

CN 1681145 A 10/2005
JP 07-288140 10/1995
(Continued)

OTHER PUBLICATIONS

Au, et al., Nanostructured metal oxides for anodes of Li-ion rechargeable batteries, Journal of Materials Research, vol. 25, No. 8, Aug. 2010, pp. 1649-1655.
(Continued)

*Primary Examiner* — Raymond Alejandro
(74) *Attorney, Agent, or Firm* — Cantor Colburn LLP

(57) ABSTRACT

Provided herein is a negative active material including an ordered porous manganese oxide, wherein pores of the ordered porous manganese oxide have a bimodal size distribution. Provided herein is a method of preparing a negative active material that includes the ordered porous manganese oxide. The invention also includes a negative electrode which includes the negative active material and a lithium battery which includes the negative electrode.

12 Claims, 21 Drawing Sheets

(51) Int. Cl.
*C01G 45/02* (2006.01)
*H01G 11/46* (2013.01)
*H01G 11/50* (2013.01)
H01M 10/0525 (2010.01)
H01G 11/06 (2013.01)

(52) U.S. Cl.
CPC .............. *H01M 4/50* (2013.01); *H01M 4/502* (2013.01); *C01P 2002/72* (2013.01); *C01P 2004/51* (2013.01); *C01P 2004/53* (2013.01); *C01P 2004/64* (2013.01); *C01P 2006/14* (2013.01); *C01P 2006/16* (2013.01); *C01P 2006/40* (2013.01); *H01G 11/06* (2013.01); *H01M 10/0525* (2013.01); *Y02E 60/122* (2013.01); *Y02E 60/13* (2013.01); *Y02P 70/54* (2015.11); *Y02T 10/7011* (2013.01); *Y02T 10/7022* (2013.01); *Y10T 428/249921* (2015.04); *Y10T 428/268* (2015.01)

(58) Field of Classification Search
CPC .............. C01P 2006/40; C01P 2006/16; C01P 2004/51; C01P 2004/53; C01P 2004/64; C01P 2002/72; B82Y 30/00
See application file for complete search history.

(56) References Cited

U.S. PATENT DOCUMENTS

| 5,604,057 | A | 2/1997 | Nazri | |
| 2005/0147887 | A1* | 7/2005 | Tang | H01M 4/244 429/229 |
| 2009/0142666 | A1 | 6/2009 | Kim et al. | |
| 2009/0176159 | A1 | 7/2009 | Zhamu et al. | |
| 2010/0323118 | A1* | 12/2010 | Mohanty | C23C 4/04 427/447 |
| 2011/0045350 | A1 | 2/2011 | Amos et al. | |

FOREIGN PATENT DOCUMENTS

| JP | 2000100430 A | 4/2000 |
| JP | 2009-164023 | 7/2009 |
| JP | 2010114086 A | 5/2010 |
| KR | 1020070045917 | 5/2007 |
| KR | 1020100052406 A | 5/2010 |
| WO | 2009106837 A1 | 9/2009 |

OTHER PUBLICATIONS

Ji, et al., Recent developments in nanostructured anode materials for rechargeable lithium-ion batteries, Energy & Environmental Science, 2011, vol. 4, pp. 2682-2699.
Lei, et al., Mesoporous carbon-manganese oxide composite as negative electrode material for supercapacitors, ScienceDirect, Microporous and Mesoporous Materials vol. 110 (2008) pp. 167-176.
Partial European Search Report for Application No. 12173009.7-1359/2541664 dated Aug. 27, 2014.
Zhang, et al., Manganese oxide-carbon composite as supercapacitor electrode materials, Microporous and Mesoporous Materials vol. 123 (2009) pp. 260-267.
Zhang, et al., Synthesis of porous manganese oxides bars via a hydrothermal-decomposition method, Materials Chemistry and Physics vol. 124 (2010) pp. 831-834.
Feng Jiao, *Mesoporous Crystalline β-MnO₂ —a Reversible Positive Electrode for Rechargeable Lithium Batteries*, 2007, 657-660 and Supporting Information; p. 1.
Cai et al., "Facile preparation of porous one-dimensional Mn2O3 nanostructures and their application as anode materials for lithium-ion batteries", Physica E 43, 2010, pp. 70-75.
Fang et al., "Electrode reactions of manganese oxides for secondary lithium batteries", Electrochemistry Communications, vol. 12, 2010, pp. 1520-1523.
Extended European Search Report for Application No. 12173009.7-1359/2541664 dated Jan. 27, 2015; 19 pages.
Feng Jiao, et al.; Mesoporous Mn2O3 and Mn3O4 With Chrystalline Walls; Advanced Materials, vol. 19, No. 22, Nov. 15, 2007; pp. 4063-4066; XP002732913.
Jung-Nam Park, et al.; Highly Ordered Mesoporous α-Mn2O3 for Catalytic Decomposition of H2O2 at Low Temperatures; Chemistry Letters, vol. 39, No. 5, Jan. 1, 2010; pp. 493-495; XP055154440.
Wang, et al.; Sol-gel Template Synthesis of Highly Ordered MnO2 Nanowire Arrays; Journal of Power Sources, Elsevier SA, CH, vol. 140, No. 1; Jan. 10, 2005; pp. 211-215; XP005003828.
Chinese Office Action with English Translation for Application No. 201210142632.2 dated Aug. 28, 2015.
Jiao, et al., Mesoporous Crystalline β-MnO2—a Reversible Positive Electrode for Rechargeable Lithium Batteries, Advanced Materials, 19, pp. 657-660, Feb. 2007.
Park, et al., Highly Ordered Mesoporous α-Mn2O3 for Catalytic Decomposition of H2O2 at Low Temperatures, The Chemical Society of Japan, 39, pp. 493-495, Apr. 2010.
Zhang, et al., Synthesis of porous manganese oxides bars via a hydrothermal-decomposition method, Materials Chemistry and Physics, 124, pp. 831-834, Nov. 2010.
Second Office Action for CN Application No. 201210142632.2, Filing Date May 9, 2012; Office Action Mail Date Apr. 27, 2016; 9 pages (English Translation Provided, 10 pages).
JP Office Action for JP Application No. 2012-142806, JP Filing Date Jun. 26, 2012; OA issue date Feb. 22, 2016; 4 pages (English Translation Provided).
Xiao-Feng Guo et al., Synthesis of Ordered Mesoporous Manganese Oxides by Double Replication for Use as an Electrode Material, 2011, pp. 186-190, vol. 32, No. 1, Bull. Korean Chem. Soc.
Xianzhong Zhang et al., Synthesis of porous manganese oxides bars via a hydrothermal-decomposition method, 2010, pp. 831-834, 124, Materials Chemistry and Physics, Elsevier.
Korean Office Action for Application No. 10-2011-0065135 dated Jun. 29, 2017, citing the above reference(s).

* cited by examiner

NEGATIVE ACTIVE MATERIAL INCLUDING MANGANESE OXIDES, NEGATIVE ELECTRODE INCLUDING THE SAME, LITHIUM BATTERY INCLUDING NEGATIVE ELECTRODE AND METHOD OF PREPARING NEGATIVE ACTIVE MATERIAL

CROSS-REFERENCE TO RELATED APPLICATION

This application claims the benefit of Korean Patent Application No. 10-2011-0065135, filed on Jun. 30, 2011 in the Korean Intellectual Property Office, the disclosure of which is incorporated herein in its entirety by reference.

BACKGROUND

1. Field of the Invention

Aspects of the present disclosure relate to negative active materials, negative electrodes including the same, lithium batteries including the negative electrodes, and methods of preparing the negative active materials.

2. Description of the Related Art

Carbonaceous materials such as graphite are widely used as negative active materials in electrochemical cells including batteries such as lithium batteries. Graphite has excellent capacity retaining characteristics and potential characteristics, and there is little change in volume during alloy formation with lithium. Thus, batteries including electrodes including graphite are highly stable. However, there is a limitation to using such a negative active material as a material for high-capacity batteries.

In addition, as a negative active material, metals that are capable of alloy formation with lithium may be used. Examples of the metals that are capable of alloy formation with lithium include silicon (Si), tin (Sn), aluminum (Al), and the like. These metals that are capable of alloy formation with lithium have very high electrical capacity, but cause a volumetric expansion during charging and discharging, thereby creating an electrically disconnected active material in an electrode and aggravating capacity retaining characteristics of batteries, accordingly.

Thus, there is a gradually increasing need to develop negative active materials with enhanced performances for high-capacity batteries.

SUMMARY

Aspects of the present invention provide negative active materials including a novel porous manganese oxide.

Aspects of the present invention provide negative electrodes including the negative active materials.

Aspects of the present invention provide lithium batteries including the negative electrodes.

Aspects of the present invention provide capacitors including the negative electrodes.

Aspects of the present invention provide methods of preparing the negative active materials.

According to an aspect of the present invention, a negative active material includes an ordered porous manganese oxide represented by Formula 1 below:

$$Mn_xO_y \qquad <\text{Formula 1}>$$

wherein $1 \leq x \leq 3$, $1 \leq y \leq 4$, $2 \leq x+y \leq 7$, and $0 < y/x < 2$.

According to another aspect of the present invention, a negative electrode includes the negative active material.

According to another aspect of the present invention, a lithium battery includes the negative electrode.

According to another aspect of the present invention, a capacitor includes the negative electrode.

According to another aspect of the present invention, a method of preparing a negative active material includes: impregnating a porous compound with a liquid containing a manganese precursor; sintering the porous compound impregnated with the liquid; and etching the sintered porous compound by using an etchant.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1A:
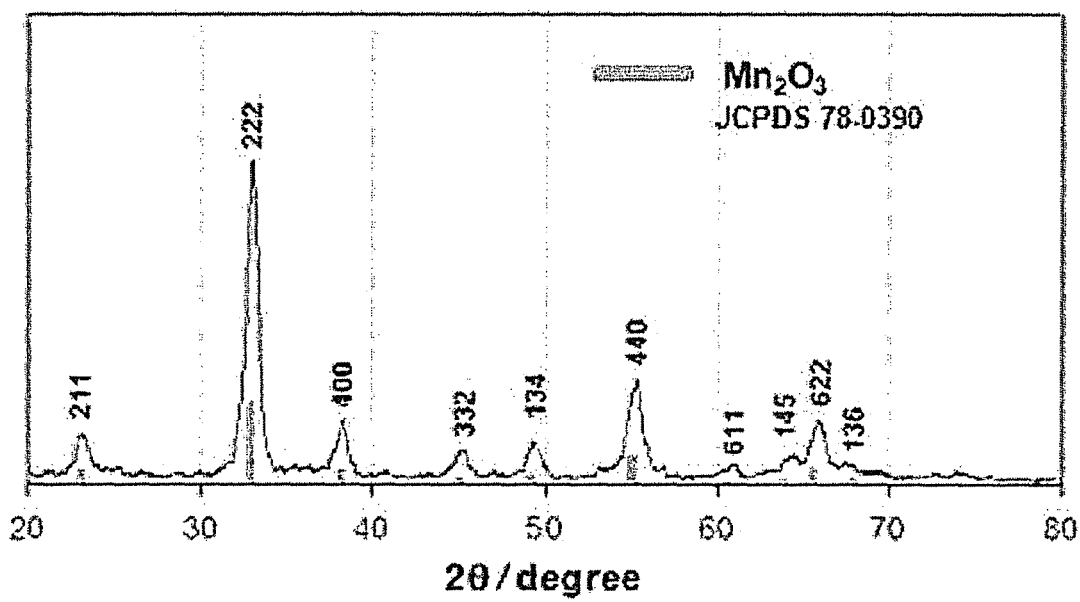
FIGS. 1A and 1B are graphs showing X-ray diffraction spectra of porous $Mn_2O_3$ prepared according to Example 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Exemplary embodiments of a negative active material, a negative electrode including the same, lithium battery and capacity including the negative electrode, and a method of preparing the negative active material will now be described in more detail.

According to an embodiment of the present invention, a negative active material includes an ordered porous manganese oxide represented by Formula 1 below:

$$Mn_xO_y \qquad \text{<Formula 1>}$$

wherein $1 \leq x \leq 3$, $1 \leq y \leq 4$, $2 \leq x+y \leq 7$, and $0 < y/x < 2$.

The ordered porous manganese oxide includes a plurality of ordered nano-sized pores, and thus a change in the volume of the ordered porous manganese oxide may be easily tolerated during charging and discharging processes.

The ordered porous manganese oxide has a plurality of ordered nano-sized pores, and thus the specific surface area thereof is very large, which increases the contact area with an electrolyte. In addition, the framework of the ordered porous manganese oxide has a thickness of several nanometers. Thus, the diffusion path of lithium ions in the framework thereof is shortened and the ordered porous manganese oxide may have enhanced high-rate characteristics. Examples of such a framework can be seen in FIGS. 7A and 7B, discussed below.

In nanoparticles having the same diameter as the thickness of the framework of the ordered porous manganese oxide, a resistance between the nanoparticles occurs. However, the framework of the ordered porous manganese oxide has a networked structure, and thus the resistance between nanoparticles does not occur, which may reduce power loss.

The plurality of nano-sized pores is arranged in an orderly form, and thus the negative active material may undergo a uniform electrochemical reaction. Accordingly, local damage or degradation of the negative active material may be prevented.

In addition, the ordered nano-sized pores of the ordered porous manganese oxide may have a bimodal size distribution.

Since the pores of the ordered porous manganese oxide have a bimodal size distribution, stress caused by a difference in expansion coefficients due to the difference in internal structures of the ordered porous manganese oxide may be easily tolerated during charging and discharging processes. The bimodal size distribution of the pores of the ordered porous manganese oxide is confirmed from the results of a nitrogen adsorption experiment. That is, it is confirmed that two pore diameter peaks appear in the Barrett-Joyner-Halenda (BJH) pore size distribution obtained as a result of the nitrogen adsorption experiment.

In the bimodal size distribution of the pores, the pores may have a first peak in the range of about 1 nm to about 5 nm and a second peak in the range of about 10 nm to about 20 nm. For example, the pores may have a first peak in the range of about 2 nm to about 5 nm and a second peak in the range of about 16 nm to about 20 nm. In other words, the ordered porous manganese oxide may include first nanopores each having a particle size of less than 10 nm and second nanopores each having a particle size of greater than 10 nm.

The ordered porous manganese oxide may be an ordered mesoporous manganese oxide. The regularity of pores of the ordered mesoporous manganese oxide may be confirmed from a peak obtained from a low-angle X-ray diffraction spectrum.

In the low-angle X-ray diffraction spectrum of the ordered porous manganese oxide, a peak with respect to a (110) plane may be observed at a Bragg (2θ) angle of 0.6±0.2°.

For example, the porous manganese oxide exhibits a typical Tetragonal 141/a space group (or its subgroup) mesostructure in the low-angle X-ray diffraction spectrum. This indicates that the porous manganese oxide has a highly ordered three-dimensional (3D) pore and framework structure. In particular, a diffraction peak with respect to a (110) plane is related to pores corresponding to the second peak in the bimodal size distribution of the pores of the porous manganese oxide. That is, when pores corresponding to the second peak exist in the bimodal size distribution of the pores of the porous manganese oxide, the peak with respect to the (110) plane necessarily exists in the low-angle X-ray diffraction spectrum.

In addition, in the low-angle X-ray diffraction spectrum of the porous manganese oxide, an intensity ratio of a peak with respect to a (110) plane to a peak with respect to a (221) plane (I(110)/I(221)) may be 0.1:1 or greater. For example, the intensity ratio of a peak with respect to a (110) plane to a peak with respect to a (221) plane (I(110)/I(221)) may be in the range of about 0.1:1 to about 10:1. A diffraction peak with respect to the (221) plane is related to pores corresponding to the first peak in the bimodal size distribution of the pores of the porous manganese oxide.

The framework of the porous manganese oxide that is formed as a wall between nanopores may have a thickness of 5 nm or greater, for example, a thickness in the range of about 5 nm to about 20 nm, for example, a thickness in the range of about 5 nm to about 10 nm. For example, the thickness of the framework of the porous manganese oxide may be in the range of about 10 nm to about 20 nm, for example, in the range of about 10 nm to about 15 nm. When the thickness of the framework is 5 nm or less, it is difficult to crystallize the porous manganese oxide. On the other hand, when the thickness of the framework is 20 nm or greater, it is difficult to prepare a template of the porous manganese oxide that has a space capable of accommodating such a framework, and thus it is substantially difficult to prepare the porous manganese oxide.

The porous manganese oxide may have a crystal size of 5 nm or greater. For example, the crystal size of the porous manganese oxide may be in the range of about 5 nm to about 30 nm.

The porous manganese oxide may have a specific surface area of about 50 m²/g to about 250 m²/g, for example, a specific surface area of about 100 m²/g to about 150 m²/g. The porous manganese oxide having this range of specific surface area is more suitable for use in enhancing performances of lithium batteries, capacitors, or the like that include the porous manganese oxide. The specific surface area of the porous manganese oxide may be adjusted by adjusting the pore size or the framework size (or thickness) thereof. When the specific surface area of the porous manganese oxide is too small, it is difficult to obtain transfer and diffusion paths of lithium ions. On the other hand, when the specific surface area of the porous manganese oxide is too large, the stability of the porous manganese oxide may be reduced.

The porous manganese oxide may have a pore volume of about 0.1 cm$^3$/g to about 2 cm$^3$/g, for example, a pore volume of about 0.5 cm$^3$/g to about 1 cm$^3$/g. The porous manganese oxide having this range of pore volume is more suitable for use in enhancing performances of lithium batteries, capacitors, or the like that include the porous manganese oxide. The pore volume of the porous manganese oxide may be adjusted by the pore size or the framework size (or thickness) thereof. When the pore volume of the porous manganese oxide is too small, it is difficult to obtain transfer and diffusion paths for lithium ions. On the other hand, when the pore volume of the porous manganese oxide is too large, capacity per unit volume of the porous manganese oxide may be reduced.

In the negative active material, the pores of the porous manganese oxide are connected to each other, thereby forming a channel. Due to the channel formation, an electrolyte may easily permeate into the porous manganese oxide and lithium ions may be easily transferred thereinto.

The pores of the porous manganese oxide of the negative active material each have a particle diameter in the range of about 1 nm to about 20 nm and are arranged in an ordered form. The framework of the porous manganese oxide, formed as a wall between nanopores, has a thickness of about 5 nm to about 20 nm, and is arranged in an ordered form. The porous manganese oxide having these ranges of pore and framework sizes is more suitable for use in enhancing performances of lithium batteries, capacitors, or the like that the negative active material.

Figure 7A:
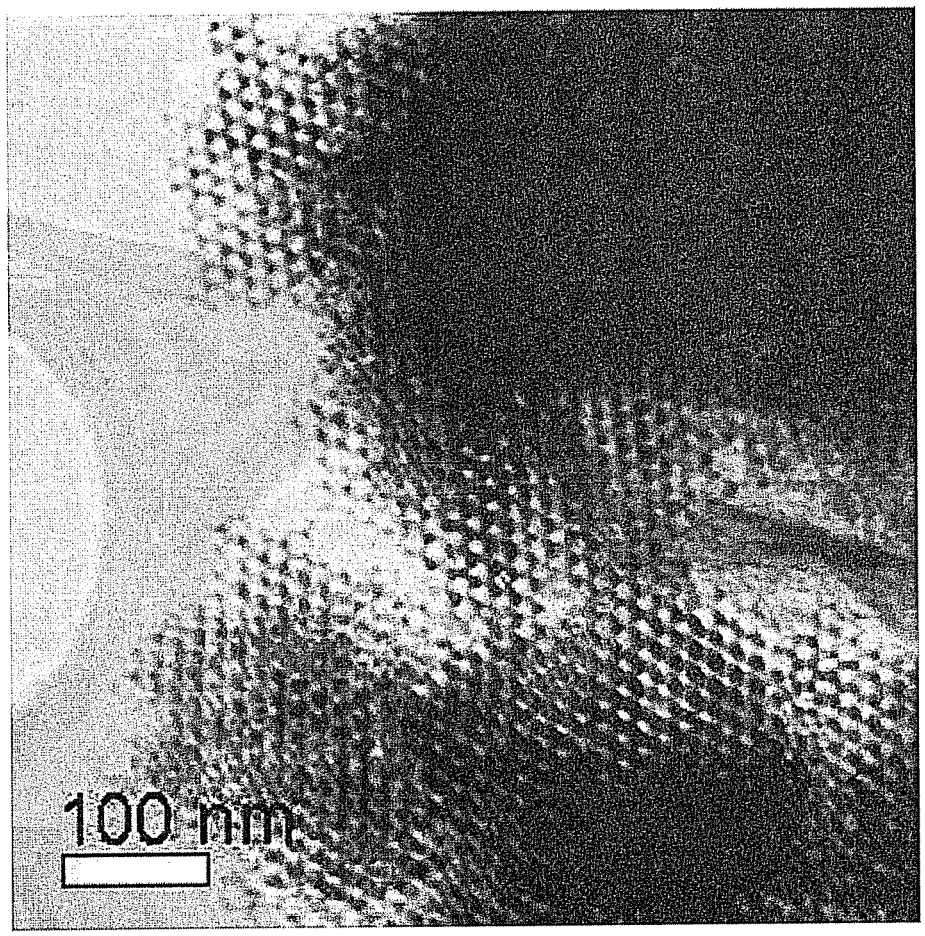
FIGS. 7A and 7B are transmission electron microscopic (TEM) images of the porous $Mn_2O_3$ of Example 1.
Figure 7B:
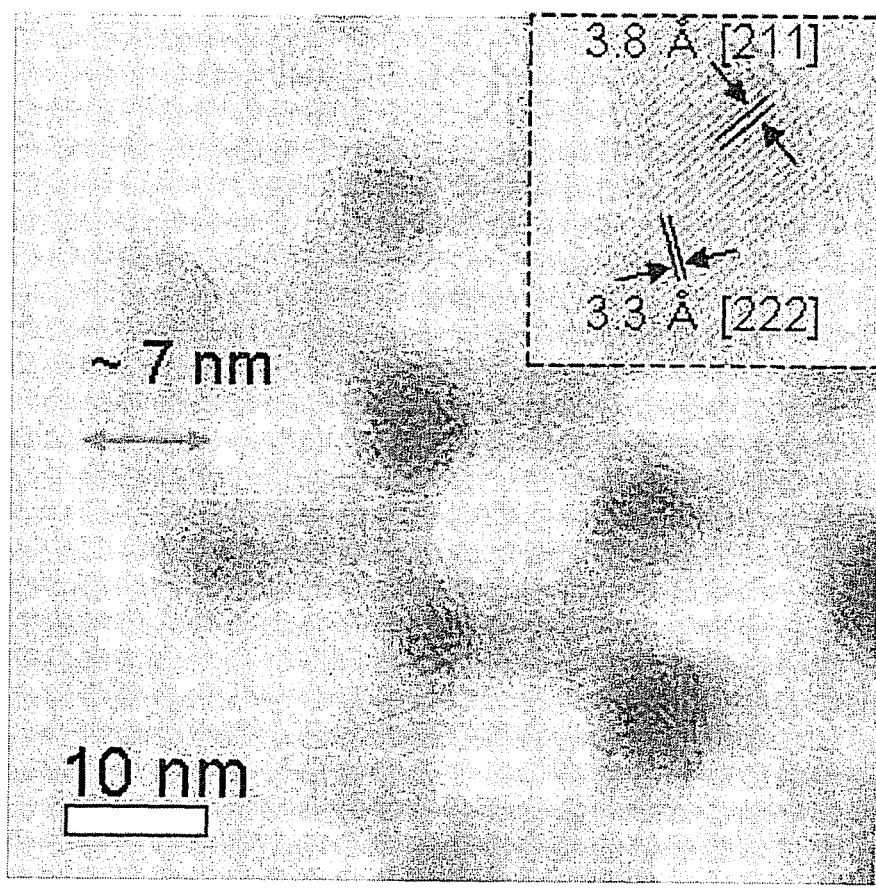

For example, the framework formed as a wall between nanopores is illustrated in FIG. 7A and represented in black. The thickness of the framework is illustrated in FIG. 7B and is represented by an arrow between spaces. The pores of the porous manganese oxide correspond to spaces in the framework shown in FIG. 7B.

The porosity of the porous manganese oxide may be 80% or less, for example, in the range of about 10% to about 70%. The porosity is the volume of pores in the total volume of the porous manganese oxide. When the porosity of the porous manganese oxide is too low, the porous manganese oxide may have a short lifetime. On the other hand, when the porosity of the porous manganese oxide is too high, the energy density of the porous manganese oxide may be reduced.

The porous manganese oxide may have a discharge capacity per unit weight of 800 mAh/g or greater and a discharge capacity per unit volume of 1,000 mAh/cc.

In particular, the porous manganese oxide of the negative active material may be represented by Formula 2 below:

  <Formula 2> wherein $1 \leq z < 2$.

For example, the porous manganese oxide of the negative active material may be MnO, Mn$_2$O$_3$, Mn$_3$O$_4$, or a mixture thereof. For example, the porous manganese oxide may be Mn$_2$O$_3$.

According to another embodiment of the present invention, a negative electrode may include the negative active material described above. For example, the negative electrode may be prepared as follows.

First, a negative active material including the ordered porous manganese oxide, a conductive material, a binder, and a solvent are mixed together to prepare a negative active material composition. The negative active material composition is then directly coated on a copper current collector, thereby completing the preparation of the negative electrode. Alternatively, the negative active material composition is cast on a separate support to form a negative active material film, and the negative active material film separated from the support is laminated on a copper current collector, thereby manufacturing a negative electrode plate.

Examples of the conductive material include carbon black, graphite microparticles, natural graphite, artificial graphite, acetylene black, carbon fibers, carbon nanotubes; powder, fibers and tubes of metal such as copper, nickel, silver and the like; and conductive polymers such as polyphenylene derivatives. However, the conductive material is not particularly limited, and may be any conductive material that is commonly used in the art.

Examples of the binder include a vinylidene fluoride/hexafluoropropylene copolymer, polyvinylidene fluoride, polyacrylonitrile, polymethylmethacrylate, polytetrafluoroethylene (PTFE), a mixture of the aforementioned polymers, and a styrene butadiene rubber-based polymer. The solvent may be N-methylpyrrolidone (NMP), acetone, water, and the like. However, the binder and the solvent are not particularly limited, and may be any binder and solvent that are commonly used in the art.

If necessary, a plasticizer may be further added to the negative active material composition to form pores inside the negative electrode plate.

The amounts of the negative active material, the conductive material, the binder, and the solvent may be the same level as those used in a typical lithium battery. At least one of the conductive material, the binder, and the solvent may be omitted according to the intended use and composition of the desired lithium batteries.

In addition, the negative active material may include other conventional negative active materials, in addition to the negative active material including the porous manganese oxide described above. The conventional negative active materials may be any negative active materials that are commonly used in typical lithium batteries. For example, the conventional negative active material may be at least one selected from the group consisting of a lithium metal, a metal capable of alloy formation with lithium, a transition metal oxide, a non-transition metal oxide, and a carbonaceous material.

Examples of the metal capable of alloy formation with lithium include silicon (Si), tin (Sn), aluminum (Al), germanium (Ge), lead (Pb), bismuth (Bi), antimony (Sb), an Si-T alloy (T is an alkali metal, an alkali earth metal, a Group XIII element, a Group XIV element, a transition metal, a rare earth element, yttrium (Y) or combinations thereof except for Si), an Sn—Z alloy (Z is an alkali metal, an alkali earth metal, a Group XIII element, a Group XIV element, a transition metal, a rare earth element, yttrium (Y) or a combination thereof except for Sn). Examples of T and Z may include magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), rhenium (Re), iron (Fe), lead (Pb), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), and combinations thereof.

For example, the transition metal oxide may be lithium titanate oxide, vanadium oxide, or lithium vanadium oxide.

For example, the non-transition metal oxide may be $SnO_2$ or $SiO_x$ where $0<x<2$.

The carbonaceous material may be a crystalline carbon, an amorphous carbon, or a mixture thereof. Examples of the crystalline carbon include natural graphite and artificial graphite that is in amorphous, plate, flake, spherical, or fibrous form. Examples of the amorphous carbon include soft carbon (carbon sintered at low temperatures), hard carbon, meso-phase pitch carbides, sintered cokes, and the like.

In addition, in order for the negative electrode to be used in other electrochemical cells such as super-capacitors other than lithium batteries, the preparation method, composition and structure of the negative electrode may be appropriately changed, except that the negative electrode includes the negative active material described above.

For example, a negative electrode for a capacitor may be manufactured by arranging a metal structure on a conductive substrate and coating the negative active material described above on the metal structure. Alternatively, the negative active material described above may be directly coated on the conductive substrate to manufacture a negative electrode for a capacitor.

According to another embodiment of the present invention, a lithium battery includes the negative electrode described above. The lithium battery may be manufactured as follows.

First, a negative electrode is fabricated as described above.

Next, a positive electrode may be fabricated using the same method as used in the negative electrode, except that a positive active material is used instead of the negative active material.

A positive active material composition may be prepared using the same conductive material, binder and solvent as those used in the negative electrode. A positive active material, a conductive material, a binder, and a solvent are mixed together to prepare the positive active material composition. The positive active material composition is directly coated on an aluminum current collector and the resulting product is then dried to fabricate a positive electrode plate on which a positive active material layer is formed. Alternatively, the positive active material composition is cast on a separate support to form a positive active material film, and the positive active material film separated from the support is laminated on the aluminum current collector to fabricate a positive electrode plate on which the positive active material film is formed.

The positive active material may be any lithium-containing metal oxide that is commonly used in the art. For example, the positive active material may be at least one of composite oxides of lithium and a metal selected from the group consisting of cobalt, manganese, nickel, and combinations thereof. In particular, the positive active material may a compound represented by one formula selected from the group consisting of $Li_aA_{1-b}B_bD_2$ where $0.90 \leq a \leq 1.8$ and $0 \leq b \leq 0.5$; $Li_aE_{1-b}B_bO_{2-c}D_c$ where $0.90 \leq a \leq 1.8$, $0 \leq b \leq 0.5$, and $0 \leq c \leq 0.05$; $LiE_{2-b}B_bO_{4-c}D_c$ where $0 \leq b \leq 0.5$ and $0 \leq c \leq 0.05$; $Li_aNi_{1-b-c}Co_bB_bD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Co_bB_bO_{2-\alpha}X_\alpha$ where $0.90 \leq a \leq 1.8$, $0 \leq b \leq 0.5$, $0 \leq c \leq 0.05$, and $0 < \alpha < 2$; $Li_aNi_{1-b-c}Co_bB_cO_{2-\alpha}X_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB_cO_{2-\alpha}X_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB_cO_{2-\alpha}X_2$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiEO2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulae above, A may be Ni, Co, Mn, or combinations thereof; B may be Al, Ni, Co, Mn, Cr, Fe, Mg, Sr, V, a rare earth element, or combinations thereof; D may be O, F, S, P, or combinations thereof; E may be Co, Mn, or combinations thereof; X may be F, S, P, or combinations thereof; G may be Al, Cr, Mn, Fe, Mg, La, Ce, Sr, V, or combinations thereof; Q may be Ti, Mo, Mn, or combinations thereof; Q may be Cr, V, Fe, Sc, Y, or combinations thereof; and J may be V, Cr, Mn, Co, Ni, Cu, or combinations thereof.

For example, the positive active material may be $LiCoO_2$, $LiMn_xO_{2x}$ where $x=1, 2$, $LiNi_{1-x}Mn_xO_{2x}$ where $0<x<1$, $Ni_{1-x-y}Co_xMn_yO_2$ where $0 \leq x \leq 0.5$, $0 \leq y \leq 0.5$, or $LiFePO_4$.

Also, the above-mentioned compound may have a coating layer on the surface, or may be mixed with another compound having a coating layer. The coating layer may include a coating element compound such as an oxide of a coating element, a hydroxide of a coating element, an oxyhydroxide of a coating element, an oxycarbonate of a coating element, or a hydroxylcarbonate of a coating element. The compound constituting the coating layer may be amorphous or crystalline. The coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed by including these elements in the compound by using a method having no adverse influence on properties of a positive active material, such as spray coating or dipping. However, the preparation method of the coating layer is not particularly limited, and it is well understood by one of ordinary skill in the art. Thus, a detailed description thereof is not provided herein.

The amounts of the positive active material, the conductive material, the binder, and the solvent may be the same level as those used in a typical lithium battery. Next, a separator interposed between the positive electrode and the negative electrode is prepared. The separator may be any separator that is commonly used in lithium batteries. In particular, the separator may have low resistance to migration of ions in an electrolyte and may have a high electrolyte-retaining ability. Examples of the separator may include glass fiber, polyester, polyethylene, polypropylene, polytetrafluoroethylene (PTFE), and combinations thereof, each of which may be a nonwoven fabric or a woven fabric. For example, a windable separator such as polyethylene, polypropylene or the like may be used for a lithium ion battery, and a separator that may retain a large amount of an organic electrolytic solution may be used for a lithium-ion polymer battery. For example, the separator may be prepared as follows.

A polymer resin, a filler, and a solvent are mixed to prepare a separator composition. The separator composition is directly coated on an electrode, and then dried to form a separator. Alternatively, the separator composition may be cast on a support and dried, and a separator film separated from the support is then laminated on the electrode, thereby completing the preparation of a separator.

Any polymer resin that is commonly used for binding electrode plates in lithium batteries may be used without limitation. Examples of the polymer resin include a vinylidenefluoride/hexafluoropropylene copolymer, polyvinylidene fluoride (PVDF), polyacrylonitrile, polymethylmethacrylate, and mixtures thereof.

Next, an electrolyte is prepared. For example, the electrolyte may be an organic electrolytic solution. In addition, the electrolyte may be in a solid form. Examples of the electrolyte include boron oxides, lithium oxynitride, and the like. However, the electrolyte is not limited to the above examples, and may be any solid electrolyte used in the art. The solid electrolyte may be formed on the negative electrode by sputtering.

For example, an organic electrolytic solution may be prepared by dissolving a lithium salt in an organic solvent. Any organic solvent used in the art may be used. Examples of the organic solvent include propylene carbonate, ethylene carbonate, fluoroethylene carbonate, butylene carbonate, dimethyl carbonate, diethyl carbonate, ethyl methyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, and mixtures thereof.

Any lithium salt that is commonly used in the art may be used. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are independently a natural number, LiCl, LiI, or a mixture thereof.

Figure 14:
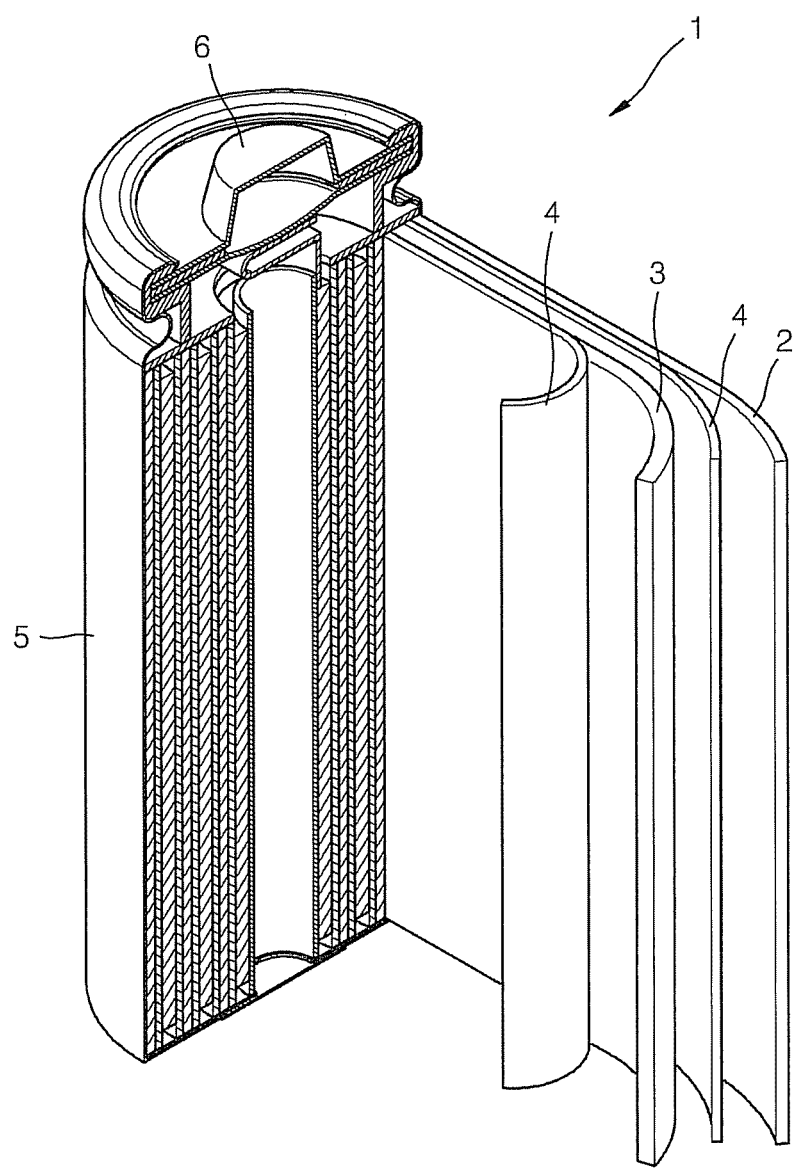
FIG. 14 is a schematic diagram of a lithium battery according to an embodiment.

FIG. 14 is a schematic diagram of a lithium battery 1 according to an embodiment. Referring to FIG. 14. The lithium battery 1 includes a positive electrode 3, a negative electrode 2, and a separator 4 disposed between the positive electrode 3 and the negative electrode 2. The positive electrode 3, the negative electrode 2, and the separator 4 are wound or folded, and then accommodated in a battery case 5. Subsequently, an organic electrolyte (not shown) is injected into the battery case 5 and the battery case 5 is sealed by a cap assembly 6, thereby completing the manufacture of the lithium battery 1. The battery case 5 may have a cylindrical shape, a rectangular shape or a thin-film shape. For example, the lithium battery 1 may be large-size thin-film-type battery. The lithium battery 1 may be a lithium ion battery.

The separator may be disposed between the positive electrode and the negative electrode to form a battery assembly. A plurality of battery assemblies may be stacked in a multi-cell structure and impregnated into an organic electrolytic solution. The resultant is put into a pouch and hermetically sealed, thereby completing the manufacture of a lithium ion polymer battery.

In addition, the plurality of battery assemblies are stacked to form a battery pack, and such a battery pack may be used in any devices requiring high capacity and high-power output. For example, the battery pack may be used in notebook computers, smart phones, or electric vehicles.

In addition, the lithium battery has excellent storage stability at a high temperature, a long lifetime, and excellent high-rate characteristics, and thus may be used in electric vehicles (EVs). For example, the lithium battery may be used in hybrid vehicles such as a plug-in hybrid electric vehicle (PHEV).

The lithium battery may have a discharge capacity of 800 mAh/g or greater per unit weight of the negative active material. In addition, the lithium battery may have a discharge capacity of 1000 mAh/cc or greater per unit volume of the negative active material.

The lithium battery may have an additional peak in the range of about 2.2 V to about 3 V with respect to lithium in any graph showing a differential capacity (dQ) versus voltage (V) profile obtained in a first charge cycle of a charge-discharge experiment.

The additional peak indicates an increase in electrochemical reversibility of an electrode reaction, and such an increase in electrochemical reversibility is determined to contribute to the electrical capacity of a mesoporous manganese oxide, which approximates theoretical capacity.

According to another embodiment of the present invention, a capacitor includes the anode described above. For example, the capacitor may be a super-capacitor having very high capacitance.

The capacitor may include the anode including the negative active material. The capacitor includes a positive electrode, a negative electrode, and a separator interposed therebetween into which an electrolytic solution is injected. Any positive electrode used in the art may be used.

The solvent used in the electrolytic solution may be at least one selected from the group consisting of acetonitrile, acetone, and propylenecarbonate. The solubility of an electrolyte used in the electrolytic solution with respect to the solvent may be 0.01 mole/L or greater, and the electrolyte may be an electrically inactive alkali metal salt in the operating voltage range of the capacitor. For example, the electrolyte may be lithium perchlorate, lithiumtetrafluoroborate, or lithiumhexafluorophosphate. The electrolytic solution may further include an additive for enhancing the properties of the capacitor. Examples of the additive include a stabilizer, a thickener, and the like.

At least one of the lithium battery and the capacitor may include the ordered porous manganese oxide represented by Formula 1 above as a positive active material. For example, the positive active material may be MnO, $Mn_2O_3$, $Mn_3O_4$, or a mixture thereof.

According to another embodiment of the present invention, a method of preparing a negative active material includes: impregnating a porous compound with a manganese precursor or a liquid containing a manganese precursor; sintering the porous compound impregnated with the liquid or the precursor; and etching the sintered porous compound by using an etchant.

In the preparation method of the negative active material, the porous compound may be silica ($SiO_2$), $Al_2O_3$, ZnO, MgO, carbon, or a mixture thereof. The porous compound is used as a template in the preparation of a porous manganese oxide. The porous compound is impregnated with the manganese precursor or the liquid containing a manganese precursor to fill the pores thereof, and the porous compound impregnated with the liquid is then sintered to obtain a composite of the porous compound and the manganese precursor. Subsequently, the porous compound is removed from the composite thereof by using an etchant to obtain a porous manganese oxide.

The manganese precursor may be $Mn(NO_3)_2.6H_2O$, $Mn(CH_3COO)_2.4H_2O$, $MnCl_2.4H_2O$ or a mixture thereof.

However, the manganese precursor is not limited to the above examples, and any manganese oxide precursor used in the art may be used.

The manganese precursor-containing liquid may be a molten material obtained by heating the manganese precursor or a solution obtained by dissolving the manganese precursor in a solvent such as water, alcohol, or the like.

The sintering temperature may be in the range of about 300° C. to about 700° C., for example, in the range of about 500° C. to about 550° C. This range of sintering temperature is suitable for preparing an ordered porous manganese oxide. When the sintering temperature is too low, it is difficult to form a crystal. On the other hand, when the sintering temperature is too high, it is difficult to form a mesostructure.

The sintering process may be performed in an oxidizing atmosphere or in a reducing atmosphere. The reducing atmosphere may be nitrogen, argon, helium, hydrogen or a mixture thereof. The oxidizing atmosphere may be an atmosphere including oxygen. For example, the oxidizing atmosphere may be air.

In the preparation of the negative active material, the etchant may be hydrofluoric acid (HF), NaOH, HF—$NH_4F$ (buffer) or a mixture thereof. However, the etchant is not limited to the above examples, and any etchant used in the art may be used. The etchant may be acid or base.

One or more embodiments of the present invention will be described in more detail with reference to the following examples. However, these examples are not intended to limit the scope of the invention.

Preparation of Negative Active Material

Example 1: Synthesis of $Mn_7O_3$

A molten material obtained as a result of heating $Mn(NO_3)_2.6H_2O$ was injected into porous $SiO_2$ in an amount of 40 parts by weight of $Mn_2O_3$ based on 100 parts by weight of the porous $SiO_2$. The porous $SiO_2$ was hydrothermally synthesized at 100° C. Subsequently, the porous $SiO_2$ into which the molten material of $Mn(NO_3)_2.6H_2O$ was injected was sintered at 550° C. for 3 hours in an air atmosphere to obtain a $SiO_2$—$Mn_2O_3$ composite. The $SiO_2$—$Mn_2O_3$ composite was added to an aqueous 2M NaOH solution, and left for 1 hour to induce a reaction therebetween and left for another 1 hour. The NaOH solution was used to remove a $SiO_2$ template from the composite. Thereafter, the resulting product was filtered to obtain a porous $Mn_2O_3$.

As illustrated in FIG. 7B, the thickness of the framework formed as a wall between pores of the porous $Mn_2O_3$ was 7 nm.

Example 2: Synthesis of $Mn_2O_3$

A porous $Mn_2O_3$ was prepared in the same manner as in Example 1, except that a porous $SiO_2$ hydrothermally synthesized at 140° C. was used instead of the porous $SiO_2$ hydrothermally synthesized at 100° C.

The thickness of the framework formed as a wall between pores of the porous $Mn_2O_3$ was 11 nm.

Example 3: Synthesis of $Mn_2O_3$

A porous $Mn_2O_3$ was prepared in the same manner as in Example 2, except that a porous $SiO_2$ hydrothermally synthesized at 150° C. was used instead of the porous $SiO_2$ hydrothermally synthesized at 140° C.

The thickness of the framework formed as a wall between pores of the porous $Mn_2O_3$ was 12.5 nm.

Example 4: Synthesis of $Mn_2O_3$

A porous $Mn_2O_3$ was prepared in the same manner as in Example 3, except that a porous $SiO_2$ hydrothermally synthesized at 160° C. was used instead of the porous $SiO_2$ hydrothermally synthesized at 150° C.

The thickness of the framework formed as a wall between pores of the porous $Mn_2O_3$ was 14 nm.

Example 5: Synthesis of $Mn_3O_4$

A molten material obtained as a result of heating $Mn(NO_3)_2.6H_2O$ was injected into porous $SiO_2$ in an amount of 40 parts by weight of $Mn_2O_3$ based on 100 parts by weight of the porous $SiO_2$. Subsequently, the porous $SiO_2$ into which the molten material of $Mn(NO_3)_2.6H_2O$ was injected was sintered at 550° C. for 3 hours in an air atmosphere to obtain a $SiO_2$—$Mn_2O_3$ composite. The $SiO_2$—$Mn_2O_3$ composite was heat treated at 300° C. for 3 hours in a reducing atmosphere including a mixed gas of $H_2$ and $N_2$ at a volume ratio of 1:1 to obtain a $SiO_2$—$Mn_3O_4$ composite. The $SiO_2$—$Mn_3O_4$ composite was added to an aqueous 2M NaOH solution, and left for 1 hour to induce a reaction therebetween and left for another 1 hour. The NaOH solution was used to remove a $SiO_2$ template from the composite. Thereafter, the resulting product was filtered to obtain a porous $Mn_3O_4$.

Example 6: Synthesis of MnO

A molten material obtained as a result of heating $Mn(NO_3)_2.6H_2O$ was injected into porous $SiO_2$ in an amount of 40 parts by weight of $Mn_2O_3$ based on 100 parts by weight of the porous $SiO_2$. Subsequently, the porous $SiO_2$ into which the molten material of $Mn(NO_3)_2.6H_2O$ was injected was sintered at 550° C. for 3 hours in an air atmosphere to obtain a $SiO_2$—$Mn_2O_3$ composite. The $SiO_2$—$Mn_2O_3$ composite was heat treated at 300° C. for 3 hours in a reducing atmosphere including a mixed gas of $H_2$ and $N_2$ at a volume ratio of 1:1 to obtain a $SiO_2$—$Mn_3O_4$ composite. The $SiO_2$—$Mn_3O_4$ composite was added to an aqueous 2M NaOH solution, and left for 1 hour to induce a reaction therebetween and left for another 1 hour. The NaOH was used to remove a $SiO_2$ template from the composite. Thereafter, the resulting product was filtered to obtain a porous $Mn_3O_4$. The porous $Mn_3O_4$ was heat treated at 400° C. for 2 hours in a reducing atmosphere including a $H_2$ gas to obtain a porous MnO.

Comparative Example 1

Bulk $Mn_2O_3$ with no pores was used.

Comparative Example 2

Bulk $Mn_3O_4$ with no pores was used.

Comparative Example 3

Bulk MnO with no pores was used.

Comparative Example 4

5 mmol of nitrilotriacetate acid and 5 mmol of $Mn(CH_3COO)_2.4H_2O$ were dissolved in 100 ml of distilled water. The resulting solution was hydrothermally treated in an autoclave at 180° C. for 6 hours to obtain a white precipitate. The white precipitate was separated by centrifugation, and dried at 80° C. for 8 hours. The dried resultant was then heat treated at 600° C. for 3 hours to synthesize porous $Mn_2O_3$ with non-ordered pores.

Manufacturing of Negative Electrode and Lithium Battery

Example 7

70 mg of the porous $Mn_2O_3$ powder prepared according to Example 1, 15 mg of a carbon conductive material (SUPER-P® Li, Timcal Inc.), 15 mg of a binder (polyamide/imide, PAI), and 15 ml of N-methylpyrrolidone (NMP) were mixed together in an agate mortar to prepare a slurry. The slurry was coated on a copper current collector to a thickness of about 50 μm by using a doctor blade, and the resultant was then dried at room temperature for 2 hours and dried again in vacuum at 200° C. for 2 hours to manufacture a negative electrode plate.

The negative electrode plate, a lithium metal as a counter electrode, a polypropylene separator as a separator (CELL-GARD® 3510), and an electrolytic solution obtained by dissolving 1.3 M of $LiPF_6$ in a mixture of ethylene carbonate (EC) and diethyl carbonate (DEC) at a mixing ratio of 3:7 (weight ratio) were used to manufacture a standard coin cell.

Examples 8 Through 12

Standard coin cells were respectively manufactured in the same manner as in Example 7, except that the porous manganese oxides prepared according to Examples 2 through 6 were used instead of the porous manganese oxide of Example 1.

Comparative Examples 5 Through 8

Standard coin cells were respectively manufactured in the same manner as in Example 7, except that the porous manganese oxides prepared according to Comparative Examples 1 through 4 were used instead of the porous manganese oxide of Example 1.

Evaluation Example 1: X-Ray Diffraction Test

An X-ray diffraction test was performed on the porous $Mn_2O_3$ powder of Example 1, and the results are illustrated in FIG. 1A. A low-angle X-ray diffraction test was also performed thereon, and the results are illustrated in FIG. 1B.

Figure 1B:
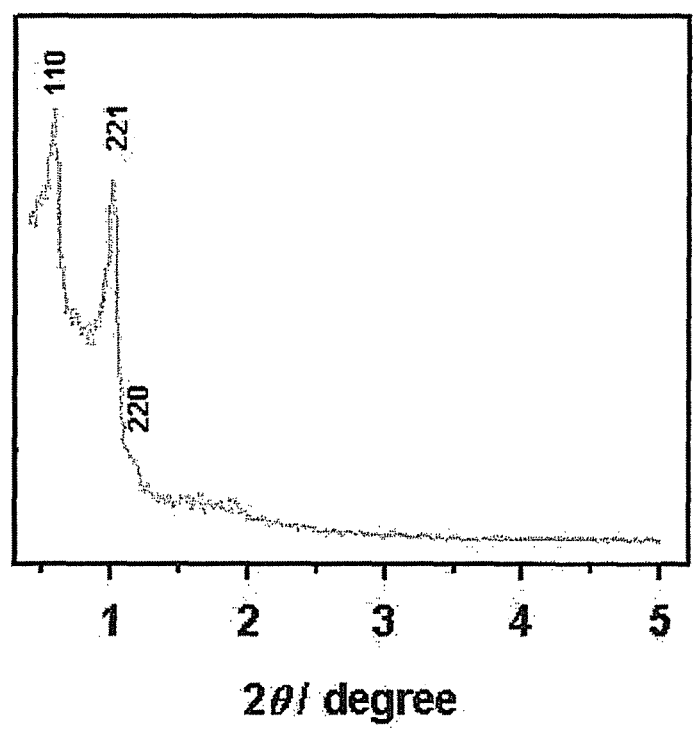

Referring to FIGS. 1A and 1B, it is confirmed that the porous $Mn_2O_3$ of Example 1 has a mesoporous structure with ordered nano-sized pores. From the results illustrated in FIG. 1A, it is confirmed that the synthesized $Mn_2O_3$ is in a crystalline phase. $Mn_2O_3$ (JCPDS 78-0390) illustrated in FIG. 1A is a known $Mn_2O_3$, and was used as a reference with respect to an X-ray diffraction pattern of $Mn_2O_3$ used in an embodiment of the present invention. In addition, a crystal size for a (222) plane was calculated to be 10.5 nm by the Scherrer equation.

Referring to FIG. 1B illustrating low-angle X-ray diffraction spectrum results, a peak with respect to a (110) plane appears at a Bragg (2θ) angle of 0.6±0.2°, and a peak with respect to a (221) plane appears at a Bragg (2θ) angle of 1.0±0.2°. Each of the (110) plane and the (221) plane correspond to a plane of highly ordered 3D framework and pore structures in the porous manganese oxide. The low-angle X-ray diffraction spectrum is a diffraction pattern by arrangement of ordered nano-sized framework and pore structures. From the results, it is confirmed that a mesoporous $Mn_2O_3$ with ordered nano-sized pores was synthesized.

Figure 2A:
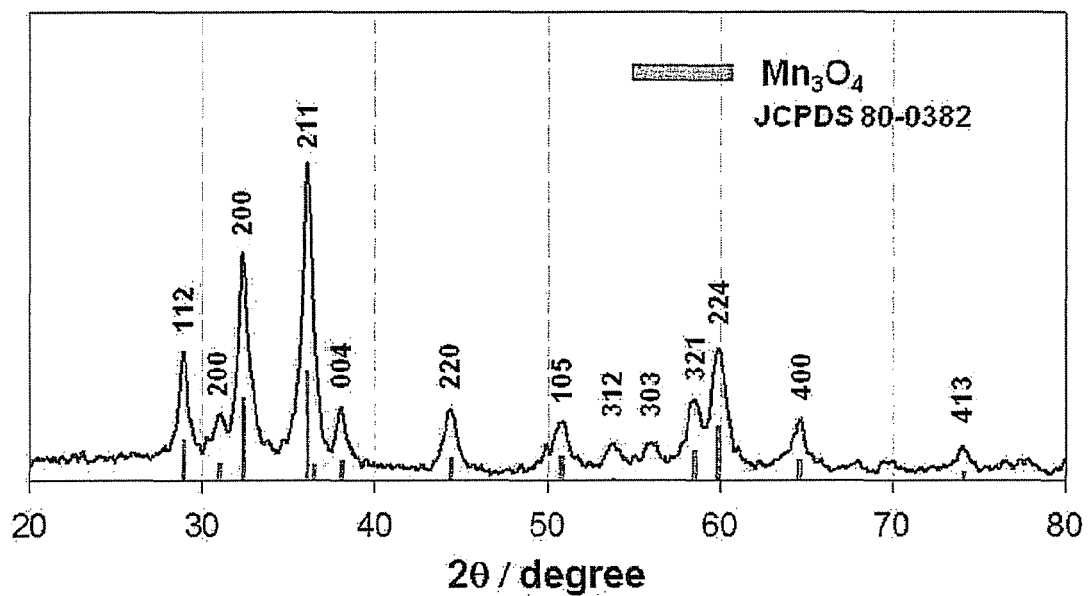
FIGS. 2A and 2B are graphs showing X-ray diffraction spectra of porous $Mn_3O_4$ prepared according to Example 5.

An X-ray diffraction test was also performed on the porous $Mn_3O_4$ powder of Example 5, and the results are illustrated in FIG. 2A. A low-angle X-ray diffraction test was also performed thereon, and the results are illustrated in FIG. 2B.

Figure 2B:
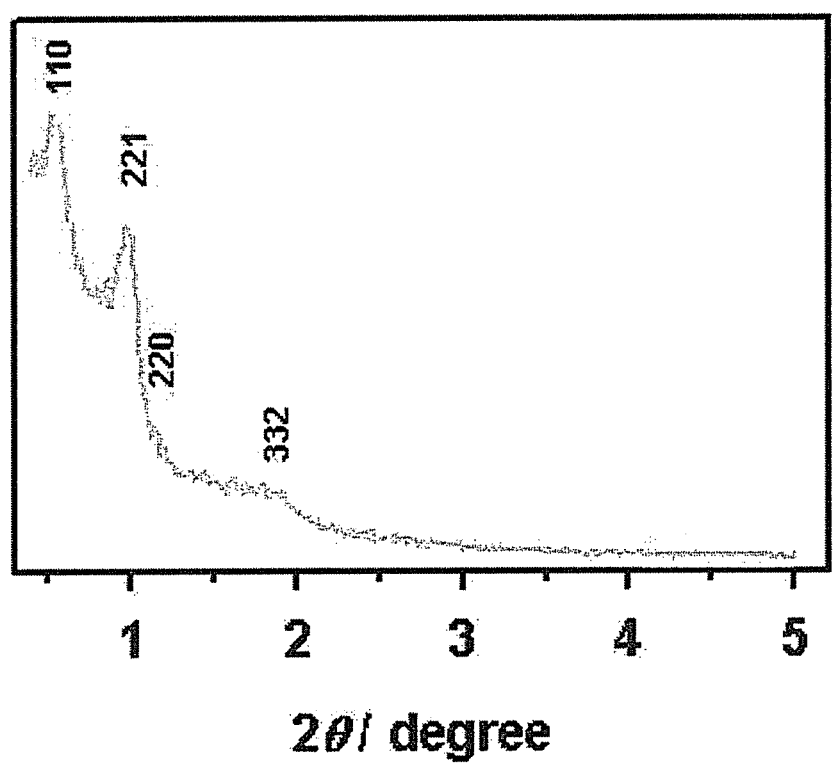

From the results illustrated in FIGS. 2A and 2B, it is confirmed that mesoporous $Mn_3O_4$ with ordered nano-sized pores was synthesized. In addition, the crystal size for a (222) plane was calculated to be 10.1 nm by the Scherrer equation.

Figure 3A:
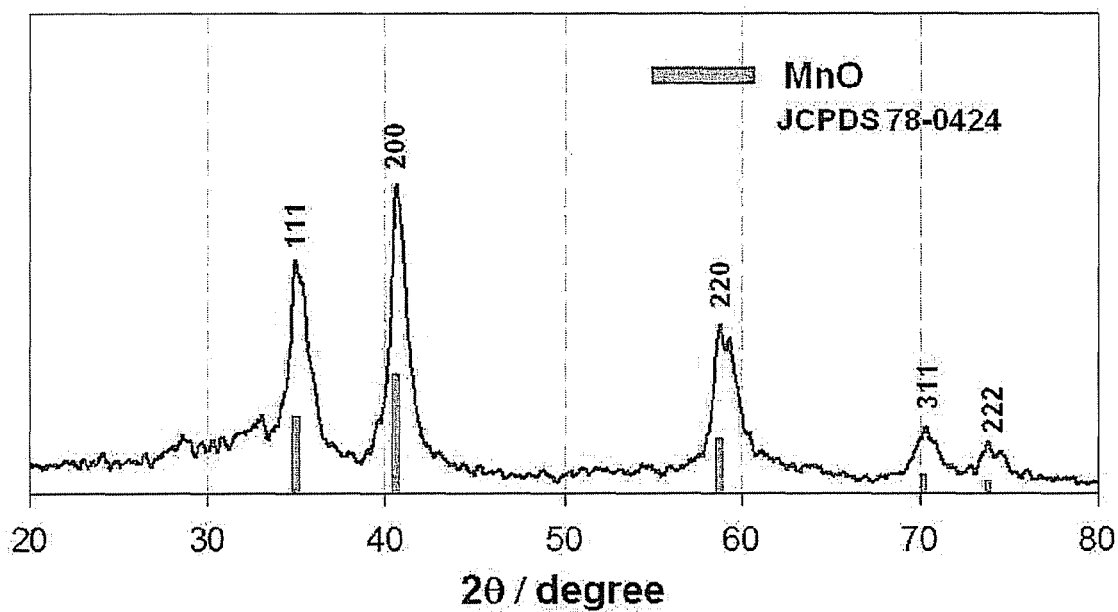
FIGS. 3A and 3B are graphs showing X-ray diffraction spectra of porous MnO prepared according to Example 6.

An X-ray diffraction test was also performed on the porous MnO powder of Example 6, and the results are illustrated in FIG. 3A. A low-angle X-ray diffraction test was also performed thereon, and the results are illustrated in FIG. 3B.

Figure 3B:
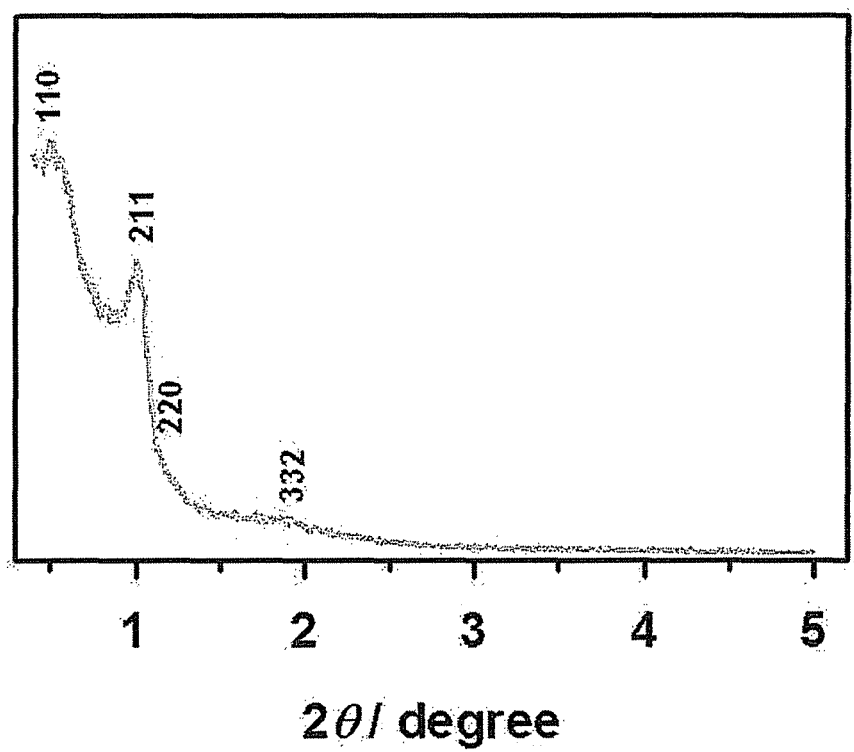

From the results illustrated in FIGS. 3A and 3B, it is confirmed that mesoporous MnO with ordered nano-sized pores was synthesized. In addition, the crystal size for a (200) plane was calculated to be 8.1 nm by the Scherrer equation.

Vertical bars illustrated in FIGS. 1A, 2A, and 3A indicate the position of peaks of manganese oxide stated in a reference.

Figure 1C:
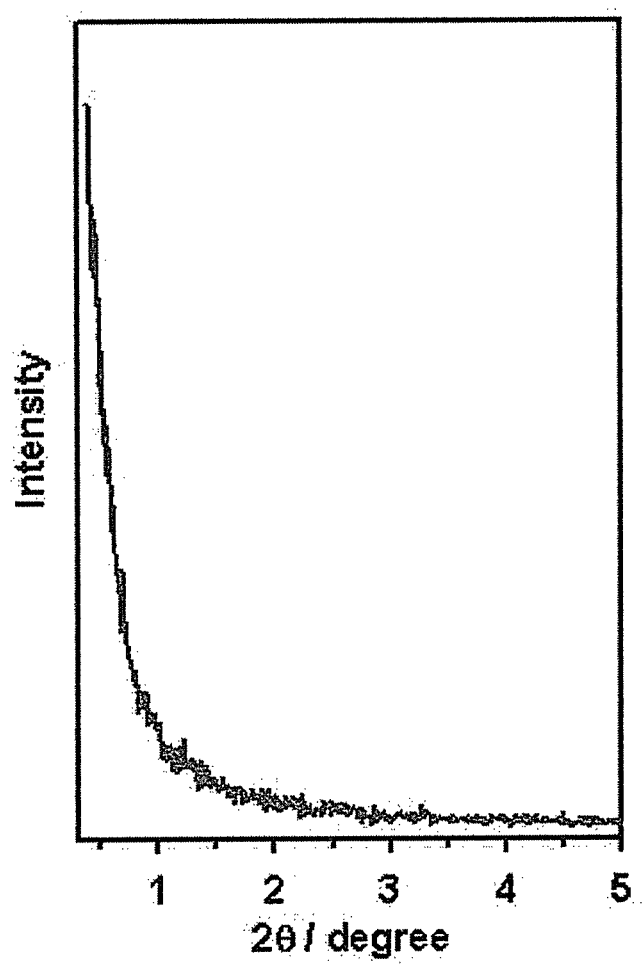
FIG. 1C is a graph showing the low-angle X-ray diffraction spectrum of bulk $Mn_2O_3$ used in Comparative Example 1.
Figure 2C:
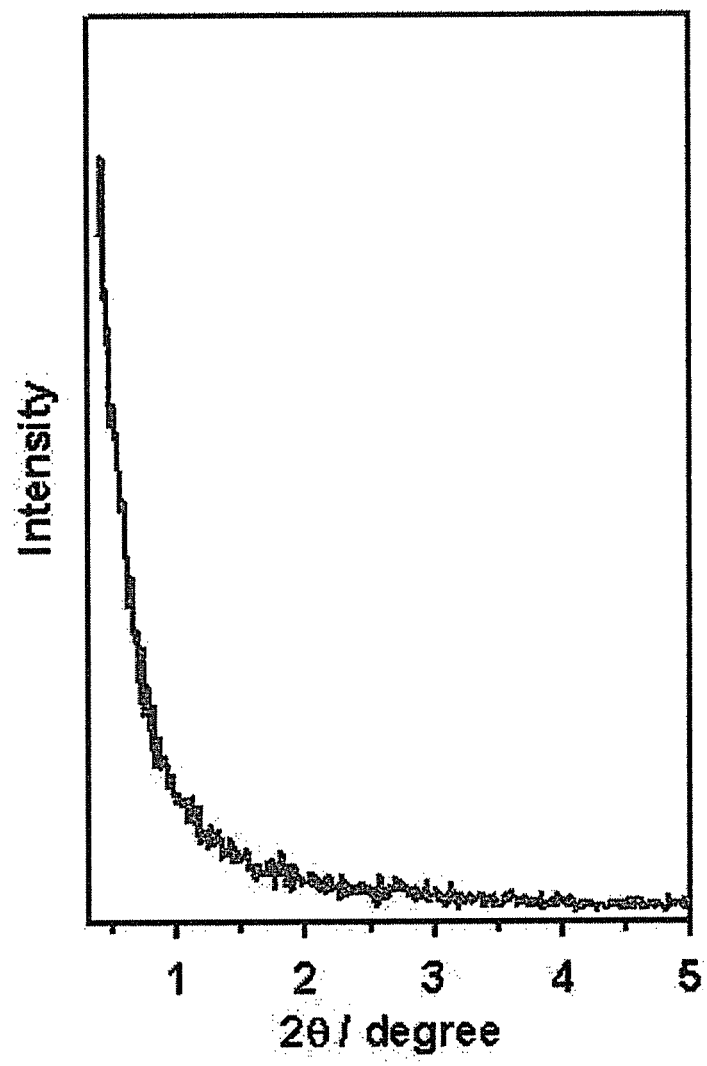
FIG. 2C is a graph showing the low-angle X-ray diffraction spectrum of bulk $Mn_3O_4$ used in Comparative Example 2.
Figure 3C:
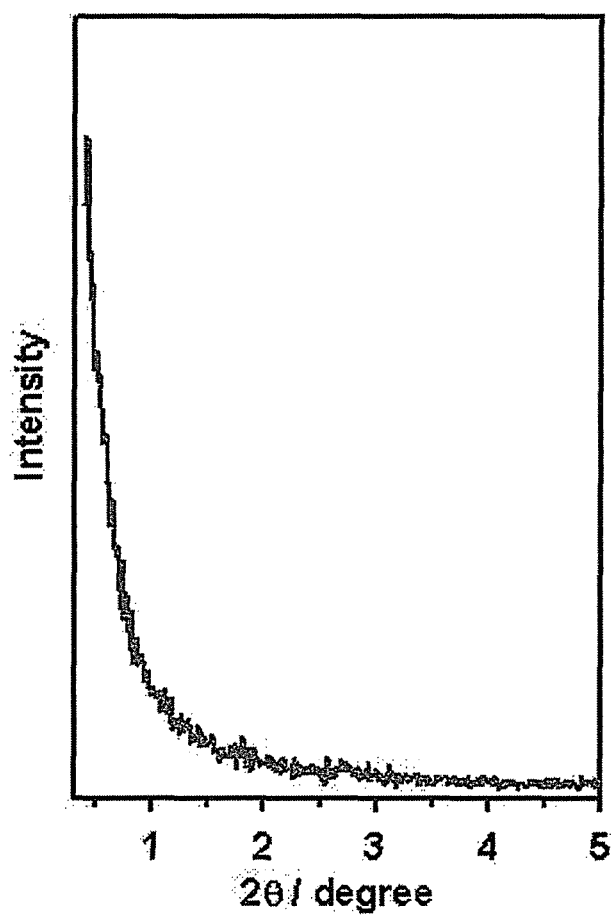
FIG. 3C is a graph showing the low-angle X-ray diffraction spectrum of bulk MnO used in Comparative Example 3.

For comparison with FIGS. 1B, 2B, and 3B, low-angle X-ray diffraction tests were performed on the bulk $Mn_2O_3$ of Comparative Example 1, the bulk $Mn_3O_4$ of Comparative Example 2, and the bulk MnO of Comparative Example 3, and the results are respectively illustrated in FIGS. 1C, 2C, and 3C.

Evaluation Example 2: Nitrogen Adsorption Experiment

Figure 4:
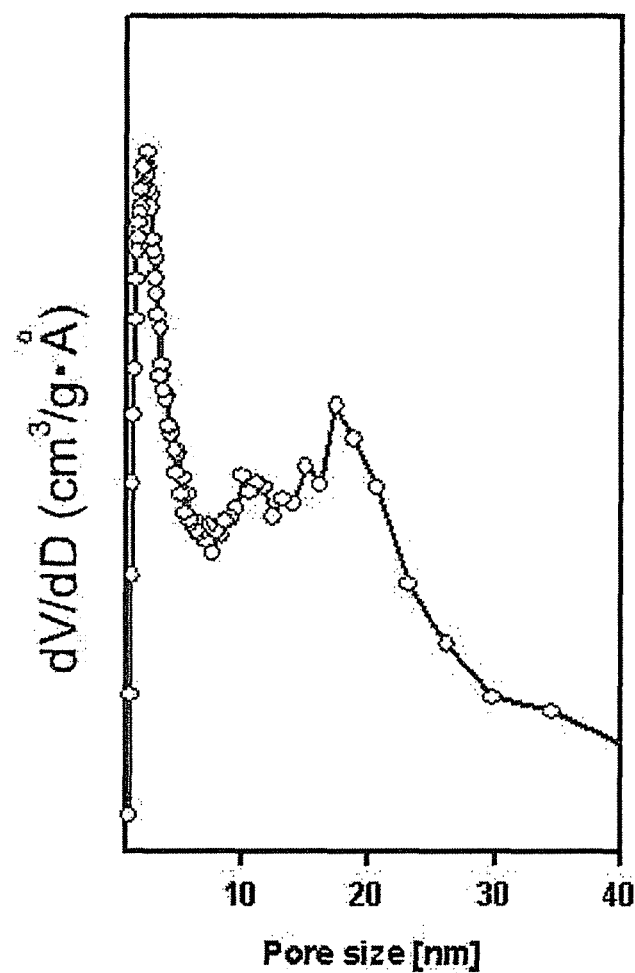
FIG. 4 is a graph showing pore distribution of the porous $Mn_2O_3$ of Example 1.

A nitrogen adsorption experiment was performed on the porous $Mn_2O_3$ powder of Example 1. In the nitrogen adsorption experiment, nitrogen was adsorbed onto a material with nanopores and desorbed therefrom, and the specific surface area and pore volume of the material with nanopores were calculated according to a difference in the amounts of adsorbed and desorbed nitrogen to obtain pore size distribution. FIG. 4 is a graph showing the Barrett-Joyner-Halenda (BJH) pore size distribution of the porous $Mn_2O_3$ of Example 1. As illustrated in FIG. 4, bimodal size distribution having two pore diameter peaks was obtained.

In particular, the specific surface area of pores of the porous $Mn_2O_3$ of Example 1 was calculated from a nitrogen adsorption/desorption graph obtained as a result of the nitrogen absorption experiment by using the Brunauer-Emmett-Teller (BET) method. The total volume of the pores thereof was directly obtained from the Y-axis of the nitrogen adsorption/desorption graph, and pore size distribution of the porous $Mn_2O_3$ was obtained using the Barrett-Joyner-Halenda (BJH) method.

The porous $Mn_2O_3$ of Example 1 was confirmed to have nano-sized pores. The specific surface area of the pores was 137 m²/g, the total volume of the pores was 0.53 cc/g, and peaks of the pores in bimodal size distribution were respectively observed at 3.5 nm and 17.4 nm.

Figure 5:
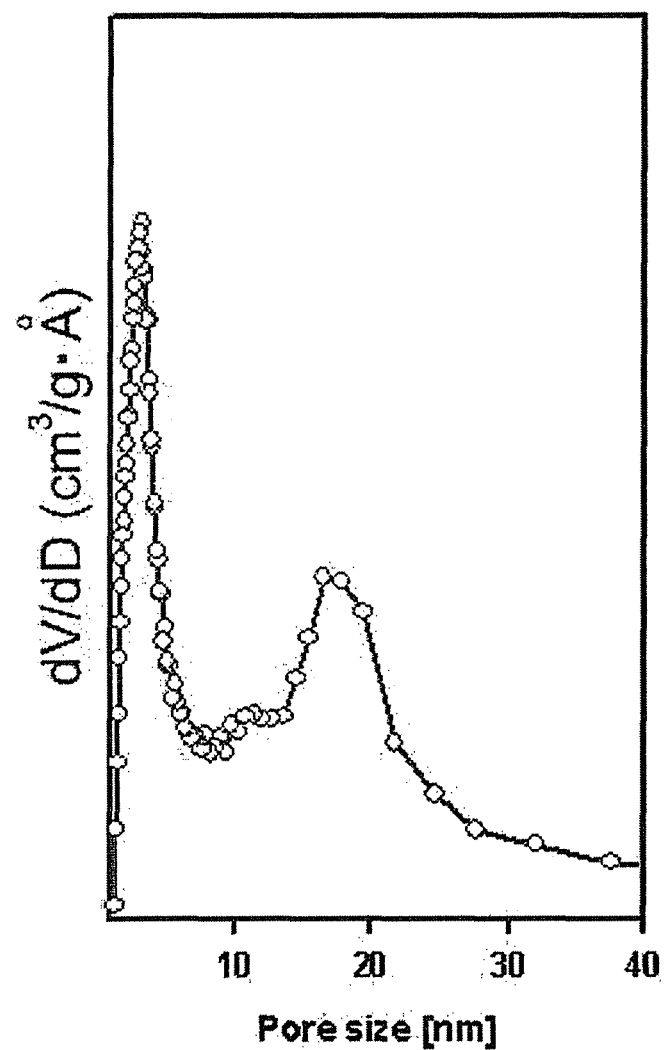
FIG. 5 is a graph showing pore distribution of the porous $Mn_3O_4$ of Example 5.

A nitrogen adsorption experiment was also performed on the porous $Mn_3O_4$ powder of Example 5. BJH pore size distribution of the porous $Mn_3O_4$ of Example 5 is illustrated in FIG. 5. The porous $Mn_3O_4$ of Example 5 was confirmed to have nano-sized pores. The specific surface area of the pores was 125 m²/g, the total volume of the pores was 0.61 cc/g, and peaks of the pores in bimodal size distribution were respectively observed at 3.3 nm and 16.7 nm.

Figure 6:
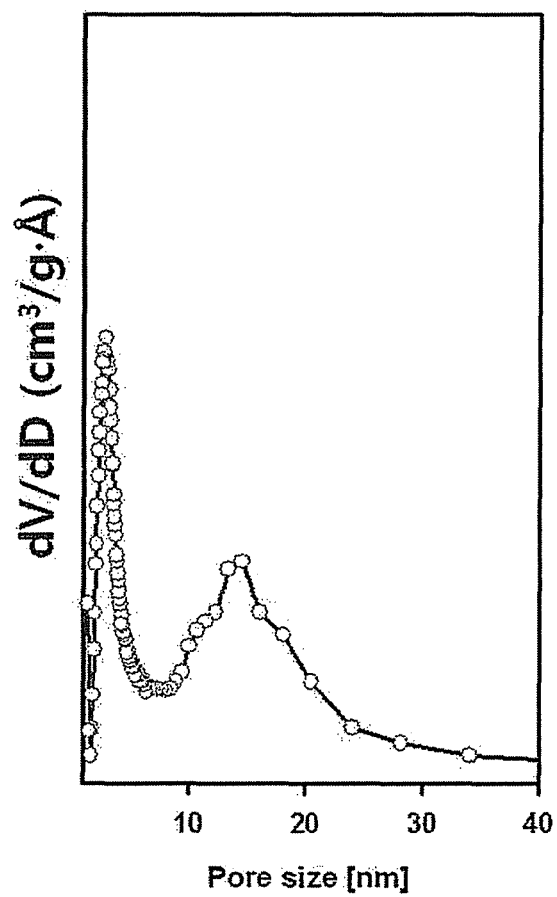
FIG. 6 is a graph showing pore distribution of the porous MnO of Example 6.

A nitrogen adsorption experiment was also performed on the porous MnO powder of Example 6. BJH pore size distribution of the porous MnO of Example 6 is illustrated in FIG. 6. The porous MnO of Example 6 was confirmed to have nano-sized pores. The specific surface area of the pores was 93 m²/g, the total volume of the pores was 0.47 cc/g, and peaks of the pores in bimodal size distribution were respectively observed at 2.8 nm and 14.5 nm.

The results are shown in Table 1 below:

TABLE 1

| | First pore peak [nm] | Second pore peak [nm] | Specific surface area [m²/g] | Pore volume [cc/g] |
|---|---|---|---|---|
| Example 1 | 3.5 | 17.4 | 137 | 0.53 |
| Example 5 | 3.3 | 16.7 | 125 | 0.61 |
| Example 6 | 2.8 | 14.5 | 93 | 0.47 |

Evaluation Example 3: Electron Transmission Microscope (TEM) Test

A TEM test was performed on the negative active material powder of Example 1, and the results are illustrated in FIGS. 7A and 7B. Referring to FIGS. 7A and 7B, the porous $Mn_2O_3$ of Example 1 includes nano-sized pores that are arranged in an ordered form and connected to each other to form a channel. The thickness of the framework formed as a wall between nanopores was about 7 nm.

In the porous manganese oxides of Examples 1 through 6, the ordered arrangement and channel formation of the nanopores were also confirmed. The thickness of the framework formed as a wall between nanopores of each porous manganese oxide is shown in Table 2 below;

TABLE 2

| | Thickness of framework formed as wall between nanopores [nm] |
|---|---|
| Example 1 | 7 ± 1 |
| Example 2 | 11 ± 1 |
| Example 3 | 12.5 ± 1 |
| Example 4 | 14 ± 1 |
| Example 5 | 7 ± 1 |
| Example 6 | 7 ± 1 |

Evaluation Example 4: Charge-Discharge Test

The lithium batteries manufactured according to Examples 7 to 12 and Comparative Examples 5 to 8 were charged by a constant current of 100 mA per 1 g of the negative active material until the voltage thereof reached 0.001 V (with respect to Li) and then discharged at the same current until the voltage thereof reached 3 V (with respect to Li). Subsequently, the cycle of charging and discharging were repeated 50 times at the same current and the same voltage range.

Figure 8:
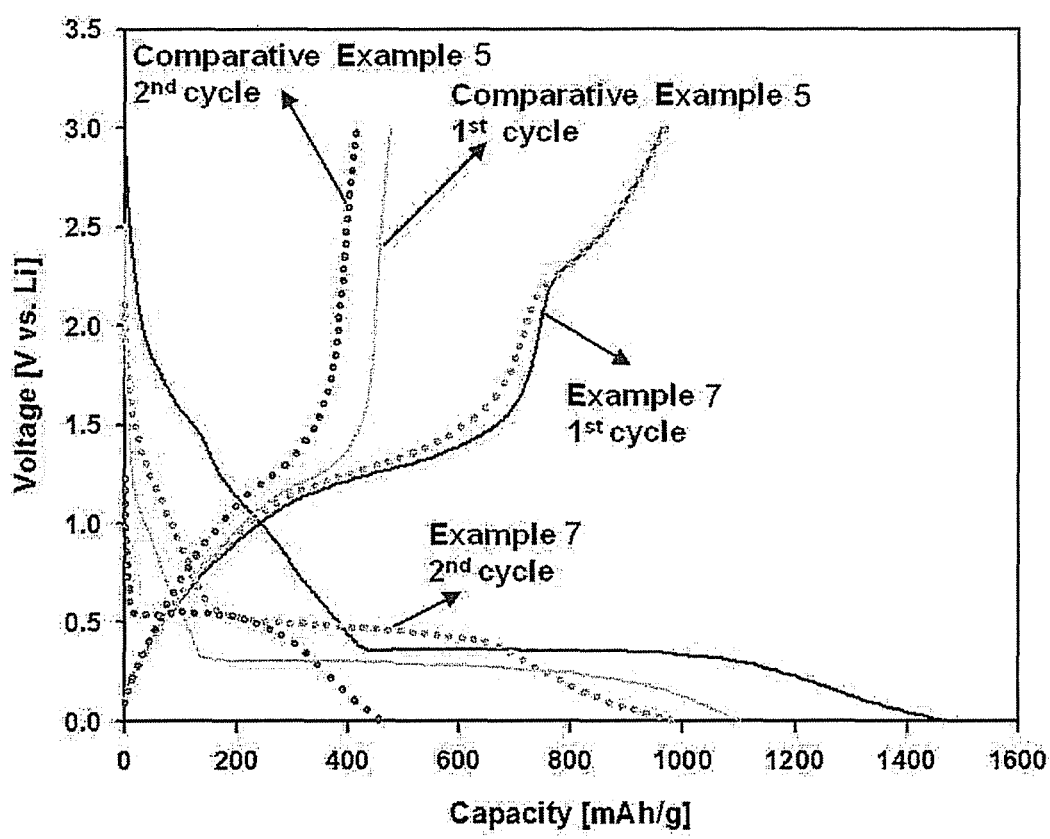
FIG. 8 is a graph showing charging and discharging test results of lithium batteries manufactured according to Example 7 and Comparative Example 5.
Figure 9:
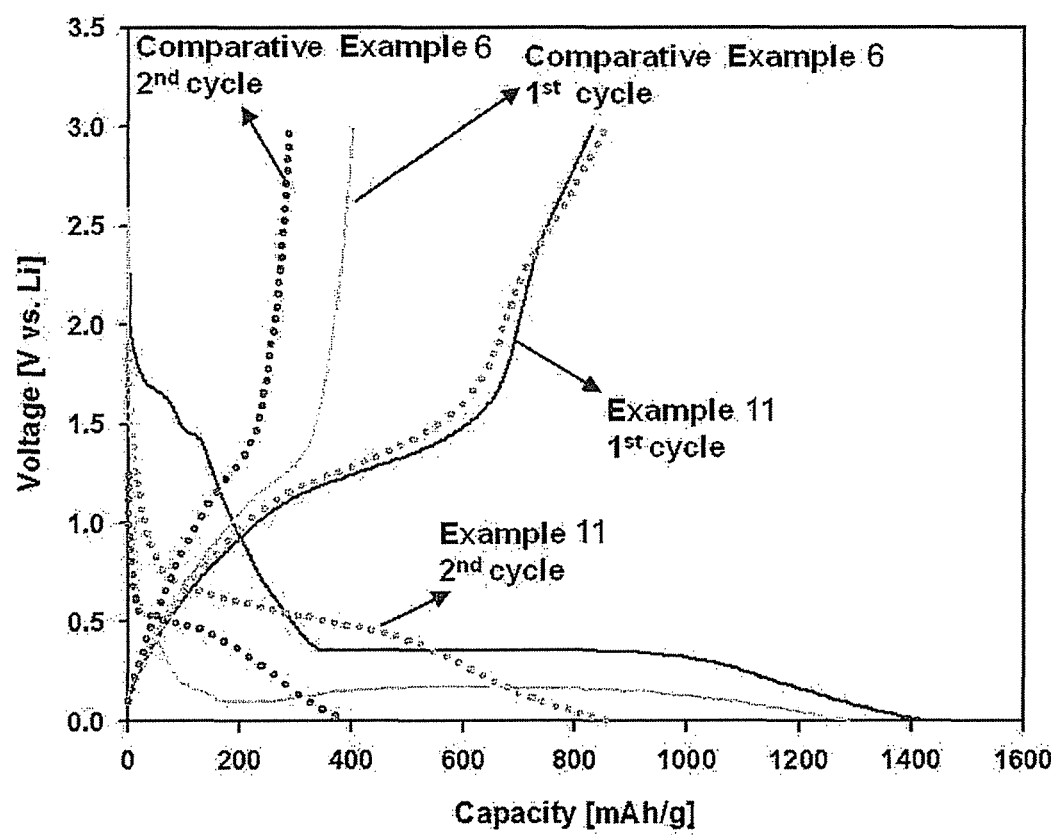
FIG. 9 is a graph showing charging and discharging test results of lithium batteries manufactured according to Example 11 and Comparative Example 6.
Figure 10:
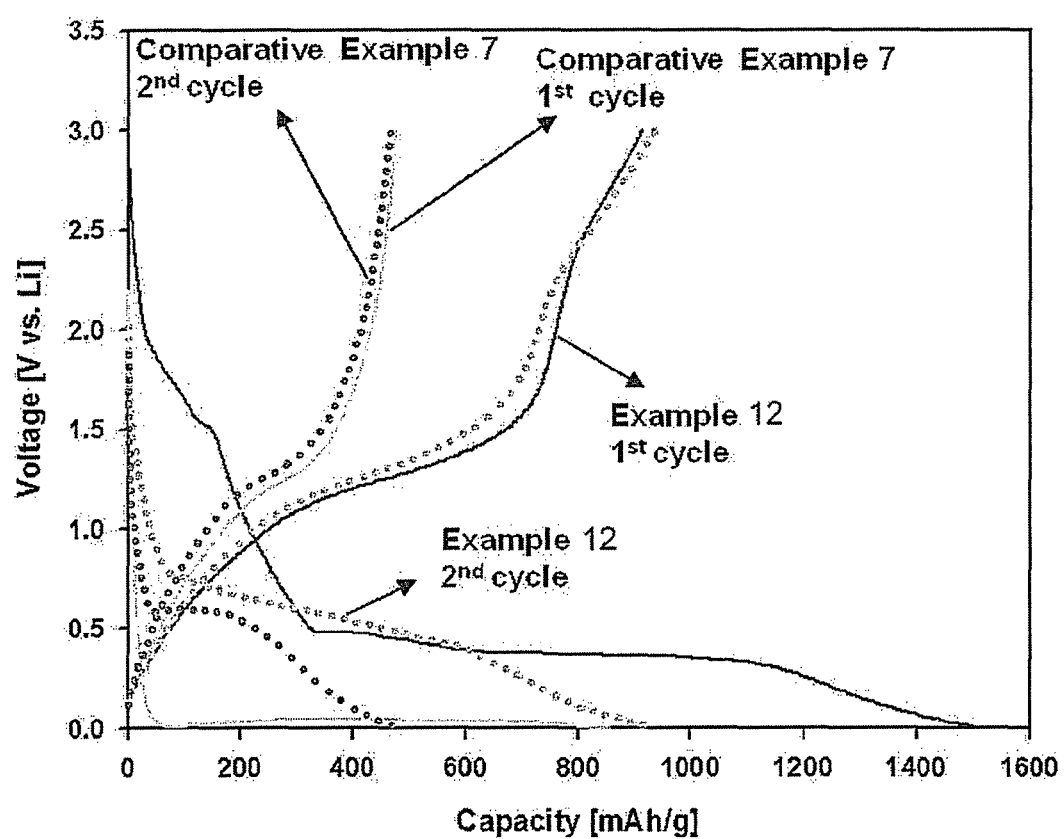
FIG. 10 is a graph showing charging and discharging test results of lithium batteries manufactured according to Example 12 and Comparative Example 7.

The results from first and second cycles of charging and discharging of the lithium batteries of Example 7 and Comparative Example 5 are illustrated in FIG. 8. The results from the first and second cycles of charging and discharging of the lithium batteries of Example 11 and Comparative Example 6 are illustrated in FIG. 9. The results from the first and second cycles of charging and discharging of the lithium batteries of Example 12 and Comparative Example 7 are illustrated in FIG. 10. A part of discharge capacity, initial charge/discharge efficiency, and a capacity retention rate of each of the lithium batteries of Examples 7 to 12 and Comparative Examples 5 to 8 are shown in Table 3 below. The capacity retention rate is defined by Equation 1 below, and the initial charge/discharge efficiency is defined by Equation 2 below:

Capacity retention rate (%)=[Discharge capacity at $50^{th}$ cycle/Discharge capacity at $1^{st}$ cycle]100  <Equation 1>

(However, for the lithium battery of Comparative Example 8, the discharge capacity at the $30^{th}$ cycle was used.)

Initial charge/discharge efficiency (%)=[Discharge capacity at $1^{st}$ cycle/Charge capacity at $1^{st}$ cycle]100  <Equation 2>

TABLE 3

| | Discharge capacity at $1^{st}$ cycle [mAh/g] | Initial charge/discharge efficiency [%] | Capacity retention rate [%] |
|---|---|---|---|
| Example 7 | 961.53 | 65.40 | 106.5 |
| Example 8 | 906.99 | 60.21 | 101.7 |
| Example 11 | 830.96 | 58.46 | 116.4 |
| Example 12 | 913.19 | 60.50 | 127.0 |
| Comparative Example 5 | 476.92 | 43.3 | 38.6 |
| Comparative Example 6 | 404.85 | 31.30 | 39.7 |
| Comparative Example 7 | 476.15 | 55.81 | 115.7 |
| Comparative Example 8 | 795.40 | 46.9 | 26.3 ($30^{th}$) |

As shown in FIGS. 8 to 10 and Table 3 above, the discharge capacity of each of the lithium batteries of Comparative Examples 5 to 7 at 3 V was less than 500 mAh/g, while the discharge capacity of each of the lithium batteries of Examples 7, 8, 11, and 12 at 3 V was 830 mAh/g or greater. In particular, the discharge capacity of the lithium battery of Example 7 approximated 1019 mAh/g, which is the theoretical discharge capacity of $Mn_2O_3$.

In addition, the initial charge/discharge efficiency and the capacity retention rate of the lithium batteries of Examples 7, 8, 11, and 12 were significantly enhanced as compared to the lithium batteries of Comparative Examples 5 to 8.

Figure 11:
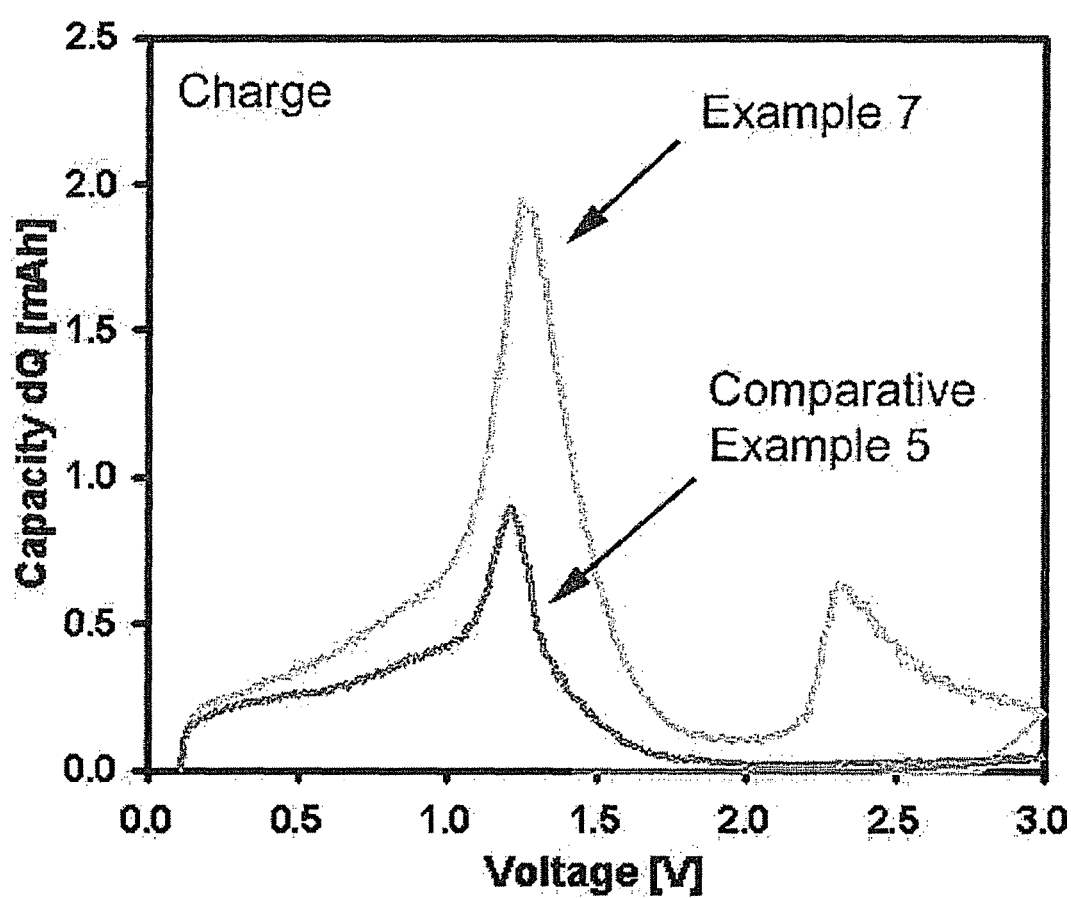
FIG. 11 is a graph showing a differential capacity (dQ) versus voltage (V) profile of lithium batteries manufactured according to Example 7 and Comparative Example 5, after a charging/discharging test.
Figure 12:
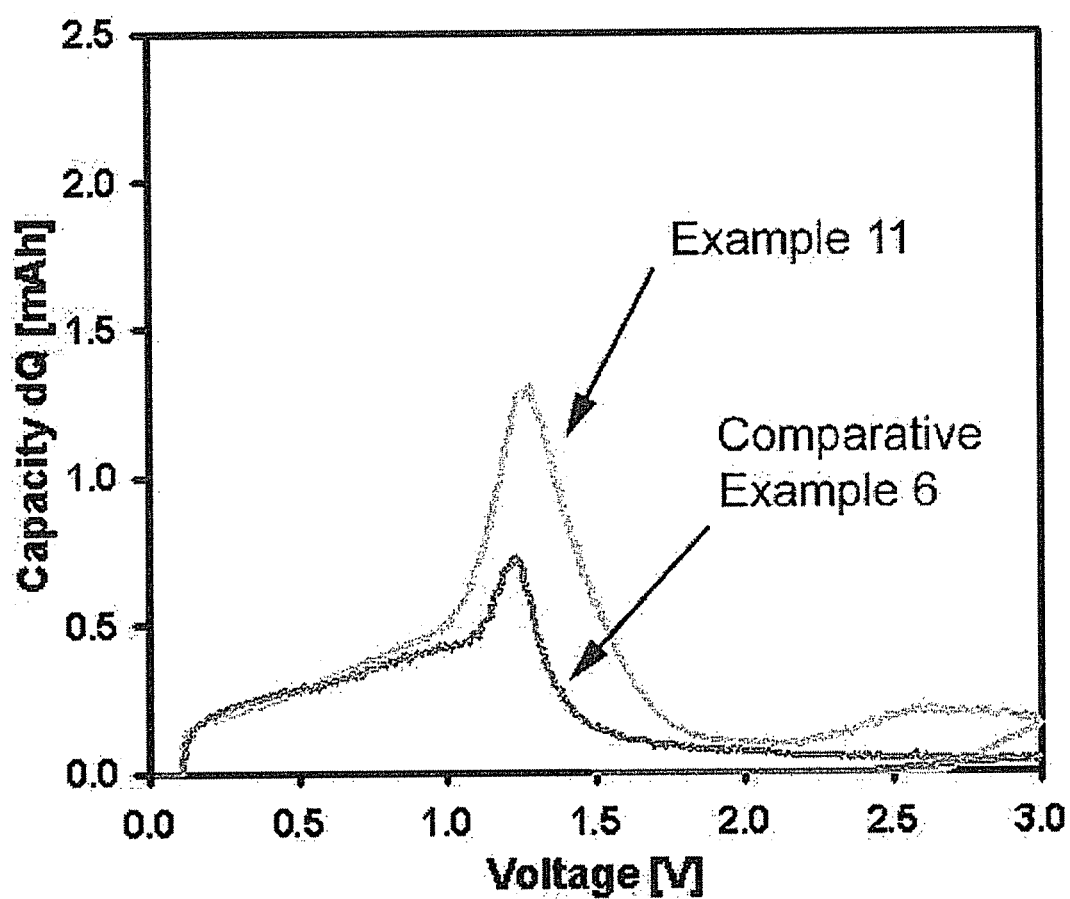
FIG. 12 is a graph showing a differential capacity (dQ) versus voltage (V) profile of lithium batteries manufactured according to Example 11 and Comparative Example 6, after a charging/discharging test.
Figure 13:
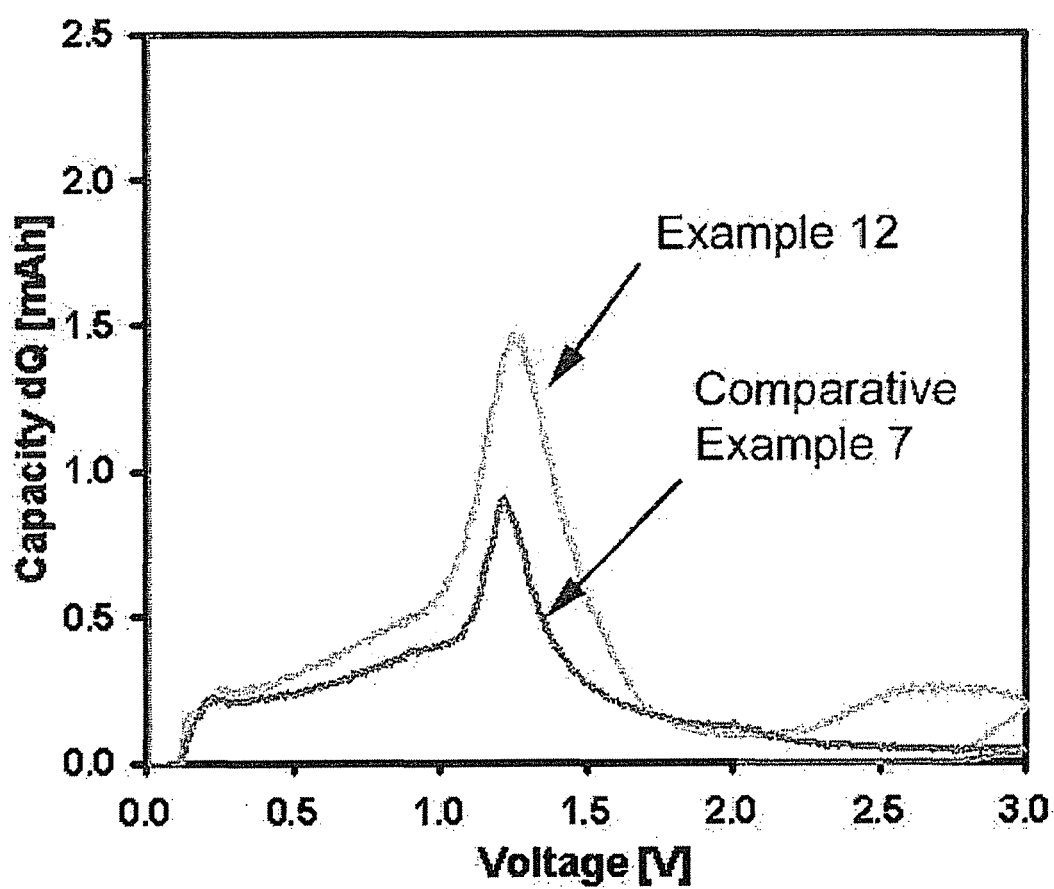
FIG. 13 is a graph showing a differential capacity (dQ) versus voltage (V) profile of lithium batteries manufactured according to Example 12 and Comparative Example 7, after a charging/discharging test.

In addition, the first-cycle charge profiles of the lithium batteries of Examples 7, 11, and 12 and Comparative Examples 5 to 7 respectively illustrated in FIGS. 8 to 10 were represented by a differential capacity (dQ) versus voltage (V) graph, and the results are respectively illustrated in FIGS. 11 to 13.

Referring to FIGS. 11 to 13, each of the lithium batteries of Examples 7, 11, and 12 has a peak at a voltage in a range of about 2.2 to about 3 V, while each of the lithium batteries of Comparative Examples 5 to 7 does not exhibit a peak. The presence of such a peak indicates an increase in electrochemical reversibility.

Such an increase in electrochemical reversibility is determined to contribute to the electrical capacity of the porous manganese oxides of Examples 1, 5, and 6, which approximates theoretical capacity.

As described above, according to the one or more of the above embodiments of the present invention, a negative active material that includes a porous manganese oxide, and thus a lithium battery including the negative active material, may have a high discharge capacity and long lifetime.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A negative active material comprising:
   a carbonaceous conductive material; where the carbonaceous conductive material is selected from the group consisting of carbon black, acetylene black, carbon fibers, carbon nanotubes; and
   an ordered porous manganese oxide, wherein the ordered porous manganese oxide comprises at least one of MnO, $Mn_2O_3$, and $Mn_3O_4$, wherein pores of the ordered porous manganese oxide have a first peak in a range of about 1 nm to about 5 nm and a second peak in a range of about 10 nm to about 20 nm,
   wherein the negative active material has a discharge capacity per unit weight of 800 mAh/g or greater, wherein the ordered porous manganese oxide has a pore volume in a range of about 0.1 $cm^3/g$ to about 2 $cm^3/g$.

2. The negative active material of claim 1, wherein pores of the ordered porous manganese oxide have a bimodal size distribution.

3. The negative active material of claim 1, wherein, in a low-angle X-ray diffraction spectrum of the ordered porous manganese oxide, a peak with respect to a (110) plane appears at a Bragg ($2\theta$) angle of $0.6\pm0.2°$.

4. The negative active material of claim 1, wherein, in a low-angle X-ray diffraction spectrum of the ordered porous manganese oxide, an intensity ratio of a peak with respect to a (110) plane to a peak with respect to a (221) plane (I(110)/I(221)) is 0.1 or greater.

5. The negative active material of claim 1, wherein, in a low-angle X-ray diffraction spectrum of the ordered porous manganese oxide, an intensity ratio of a peak with respect to a (110) plane to a peak with respect to a (221) plane (I(110)/I(221)) is in a range of about 0.1 to about 10.

6. The negative active material of claim 1, wherein a framework of the ordered porous manganese oxide has a thickness of 5 nm or greater.

7. The negative active material of claim 1, wherein a framework of the ordered porous manganese oxide has a thickness in a range of about 5 nm to about 20 nm.

8. The negative active material of claim 1, wherein the ordered porous manganese oxide has a crystal size of 5 nm or greater.

9. The negative active material of claim 1, wherein the ordered porous manganese oxide has a crystal size in a range of about 5 nm to about 30 nm.

10. The negative active material of claim 1, wherein the ordered porous manganese oxide has a pore volume in a range of about 0.5 $m^2/g$ to about 1 $cm^3/g$.

11. The negative active material of claim 1, wherein pores of the ordered porous manganese oxide are connected to each other to form a channel.

12. The negative active material of claim 1, wherein pores of the ordered porous manganese oxide each have a diameter of about 1 nm to about 20 nm, and a framework formed as a wall between the pores has a thickness of about 5 nm to about 20 nm.

* * * * *